2,845,443
Patented July 29, 1958

2,845,443
ACID ANTHRAQUINONE DYESTUFFS

Peter Hindermann, Batterie, Basel, and Hans-Peter Kölliker and Peter Trautzl, Basel, Switzerland, assignors to J. R. Geigy A. G., Basel, Switzerland No Drawing. Application December 23, 1955
Serial No. 554,934
Claims priority, application Switzerland December 31, 1954
7 Claims. (Cl. 260—373)

The present invention concerns reddish-blue to greenish-blue acid anthraquinone dyestuffs which, due to their great affinity to polypeptide fibres even in a neutral to weakly acid dye bath, are suitable for the dyeing of wool under conditions which do not injure the fibres. It also concerns processes for the production of the new acid anthraquinone dyestuffs as well as dyeing processes for natural and synthetic polypeptide fibres using these new anthraquinone dyestuffs and, further, as industrial product, the polypeptide material dyed fast with the aid of these dyestuffs.

It has been found that very valuable acid anthraquinone dyestuffs which dye wool in very fast reddish-blue to greenish-blue shades even in a neutral to weakly acid dyebath are obtained by reacting a 1-cyclohexylamino anthraquinone compound having a substituent which can be exchanged in the 4-position and which may also be still further substituted, by methods known per se with an aminophenyl aryl ether to form the corresponding 1.4-diamino anthraquinone compound, sulphonating the dye base so obtained and converting the dyestuff sulphonic acid into water soluble salts.

Both the cyclohexyl radical as well as the anthraquinone ring can be further substituted in the 1-cyclohexylamino anthraquinone compounds, having a substituent which can be exchanged, which are usable according to the present invention. Advantageous substituents of the cyclohexyl ring are saturated hydrocarbon radicals, e. g. alkyl groups, cyclohexyl groups and fused alkylene groups. The anthraquinone ring can be further substituted advantageously in the β-position, e. g. in the 2-, 6- or 7-position it can contain halogens such as chlorine, bromine or fluorine and possibly also alkyl sulphonyl groups. Examples of substituents which can be exchanged in the 4-position of the anthraquinone radical are halogens, hydroxyl, alkoxy or nitro groups.

It is of advantage to use the 1-cyclohexylamine-4-halogen anthraquinone compounds, some of which are already known. These are obtained by reacting 1-halogen anthraquinone with cyclohexylamine, 1-amino-4-methyl cyclohexane, 1-amino-2.4.6-trimethyl cyclohexane, 1-amino-3.5-diethyl cyclohexane, 1-amino-2- or 4-cyclohexyl cyclohexane, 1- or 2-aminodecalin and similar compounds and halogenating the 1-cyclohexylamino anthraquinones obtained to form the corresponding 4-halogen or 2.4-dihalogen anthraquinone compounds. Bromine is used advantageously for the halogenation because the 4-bromo anthraquinone compounds react particularly easily with aminophenyl aryl ethers. Also anthraquinone derivatives which contain two substituents which can be exchanged in the 1- and 4-positions can possibly be reacted with amino-cyclohexane compounds under such conditions that only one cyclohexylamine radical is introduced and then the process according to the present invention followed. The 1.4-dihalogen anthraquinones and, in particular, 1.4-dihydroxy anthraquinone for example can be used in this process. However, in general, purer intermediate products which are usable according to the present invention are obtained in better yields according to the first method.

In the process according to the present invention and in the claims, both the oxygen as well as the sulphur ethers are to be understood by the term aminophenyl aryl ethers because both classes of compounds can be used. These aminophenyl aryl ethers can contain the usual non-ionogenic substituents in the aromatic rings, for example, methyl, ethyl, propyl, butyl, methoxy, ethoxy, phenoxy, phenylthio, benzyloxy, alkyl sulphonyl, acetylamino, sulphonic acid dialkyl amide groups or halogens such as chlorine, bromine or fluorine. Advantageously the aminodiphenyl oxygen or aminodiphenylthio ethers are used. Of the 4-aminodiphenyl ethers, those dialkylated in the 3.5-position, in particular the 3.5-dimethyl compounds, produce particularly valuable reddish-blue to blue acid anthraquinone dyestuffs according to the present invention. On the other hand, very valuable greenish-blue acid anthraquinone dyestuffs are obtained by using 2-aminodiphenyl oxygen or thio ethers.

The condensation of the 1-cyclohexylamino anthraquinone compounds having a substituent which can be exchanged in the 4-position of the anthraquinone ring with the aminophenyl aryl ethers is performed by methods known per se by heating the components as a melt or in the presence of lower fatty acids or of high boiling alcohols such as butanol or ethylene glycol monomethyl or monoethyl ether, possibly in the presence of agents which bind the mineral acid or partly reduce the quinone, as well as of copper-containing catalysts or stabilisers containing boron. It is advantageous to use an excess of the aminophenyl aryl ethers which, on completion of the reaction, is removed, whether they be dissolved in aqueous mineral acids or in organic solvents, in which form the diluent in the reaction can often be used.

The dye bases which can, if necessary, be purified by recrystallisation, namely the 1-cyclohexylamino-4-(aryloxy or arylthiophenyl)-amino anthraquinone compounds which, as mentioned above, can be further substituted in the anthraquinone ring by non-ionogenic substituents, are finally sulphonated, also by methods known per se. In the sulphonation care should be taken that in general not more than two sulphonic acid groups are introduced if the best possible drawing power onto wool from a neutral to weakly acid bath is desired. The products of the treatment may be characterized as acid dyestuffs of the anthraquinone series having the general formula

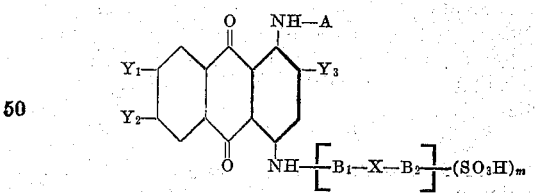

wherein A represents a hydrocarbon radical of the cyclohexane series, $B_1$ represents a phenylene radical, $B_2$ represents a member selected from the group consisting of phenyl and naphthyl radicals, X represents a member selected from the group consisting of O and S, $Y_1$, $Y_2$ and $Y_3$ each represent a member selected from the group consisting of hydrogen, chlorine, bromine and fluorine, and m is a numeral not greater than two.

The sulphonation can be performed with concentrated sulphuric acid, with oleum having a low content of free sulphur trioxide, with chlorosulphonic acid, with sulphur trioxide, advantageously in the form of the addition compounds with pyridine or dioxan, optionally in inert solvents for the dye base. The dyestuff sulphonic acids freed from undesired accompanying substances are then converted in aqueous suspension into the water soluble alkali or ammonium salts, for example into the lithium, sodium, potassium or ammonium salts. Most of these alkali salts dissolve in hot water and also in concentrated sulphuric acid with a blue colour. They dye wool in a neutral to weakly acid bath in valuable reddish or greenish blue shades. The wool dyeings have very good wet and light fastness properties. The new dyestuffs can also be used for the dyeing of other natural and synthetic polypeptide fibres, for example for the dyeing of silk, lanital fibres, superpolyamide and superpolyurethane fibres.

The following examples give further details regarding the production and use of the new acid anthraquinone dyestuffs. They serve, however, only to illustrate the invention without limiting it in any way. In the examples where not otherwise stated, the parts are given as parts by weight and the temperatures are given in degrees centigrade. Where parts by volume are expressly mentioned, their relationship to parts by weight is as that of litres to kilogrammes.

*Example 1*

38.4 parts of 1-cyclohexylamino-4-bromo anthraquinone are stirred for 24 hours at 135–140° with 39.8 parts of 4-amino-4'-methyldiphenyl ether, 10.4 parts of anhydrous potassium acetate and 1 part of copper acetate. On adding 150 parts of N-butyl alcohol at 110° to the melt, the condensation product, 1-cyclohexylamino-4-(4'-p-methylphenoxy-anilino)-anthraquinone of the formula:

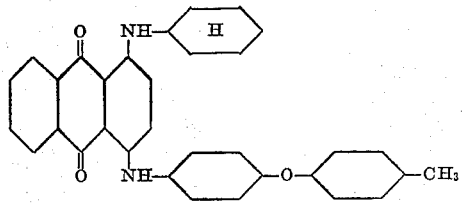

precipitates in crystalline form. It is filtered off and washed with a little warm N-butyl alcohol, with strongly diluted hydrochloric acid and then with warm water.

The dried dye base is sulphonated by the usual methods in concentrated sulphuric acid. The alkali salts of the sulphonated dyestuff dissolve in water with a greenish blue and in concentrated sulphuric acid with a greenish, dull grey-blue colour. They dye wool and silk in a neutral to weakly acid bath in greenish-blue shades. The wool dyeings have very good fastness to milling and light.

If in the above example the 39.8 parts of 4-amino-4'-methyldiphenyl ether named are replaced by the same number of parts of 4-amino-2'-methyldiphenyl ether or 4-amino-3'-methyldiphenyl ether or by 37 parts of 4-aminodiphenyl ether, then similar dyestuffs are obtained which also dye wool and silk from a weakly acid bath in greenish-blue shades which have similar good fastness properties.

*Example 2*

A melt of 38.4 parts of 1-cyclohexylamino-4-bromo anthraquinone, 43.9 parts of 4-amino-4'-chlorodiphenyl ether, 8.5 parts of anhydrous sodium acetate and 0.5 part of copper powder is stirred for 20 hours at 140–145°. A hot mixture of 200 parts of water and 15 parts of concentrated hydrochloric acid is added at 95°. The crude product which precipitates is filtered off and washed with hot water.

The precipitate is recrystallised from N-butyl alcohol and produces, in excellent yield and purity, 1-cyclohexyl-amino-4-(4'-p-chlorophenoxy-anilino)-anthraquinone of the formula:

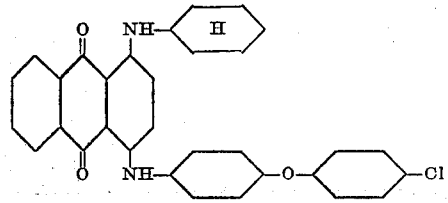

10 parts of the dry base are dissolved in 60 parts of sulphuric acid monohydrate and stirred at room temperature until a sample completely dissolves in a lot of hot water. The precipitate obtained by pouring onto 200 parts of ice is filtered off under suction, pasted with 250 parts of water, neutralised with caustic soda lye and precipitated as the sodium salt by the addition of 5 parts of sodium chloride and isolated. It is a dark powder which dissolves in water with a pure greenish-blue and in concentrated sulphuric acid with a dull greenish-grey blue colour. Very pure greenish-blue dyeings on wool and silk are obtained therewith from a neutral to weakly acid bath. The dyeings have very good washing, milling and light fastness properties.

If in the above example the 43.9 parts of 4-amino-4'-chlorodiphenyl ether are replaced by 52.8 parts of 4-amino-4'-bromodiphenyl ether or if 46.3 parts of 1-cyclohexylamino-2.4-dibromoanthraquinone are used instead of 38.4 parts of 1-cyclohexylamino-4-bromo anthraquinone, then greenish blue dyestuffs are obtained which have similar good washing, milling and light fastness properties.

*Example 3*

46.6 parts of 1-(4'-cyclohexyl-cyclohexylamino)-4-bromo anthraquinone are stirred for 24 hours at 110–115° in 50 parts of N-butyl alcohol with 38.5 parts of 2-amino-5-chlorodiphenyl ether with the addition of 10.4 parts of potassium acetate and 1 part of copper acetate. After the addition of 100 parts of N-butyl alcohol at 100°, the whole is stirred for another 3 hours at 80–90°, the crystalline precipitate is filtered off, washed with cold N-butyl alcohol, with strongly diluted hydrochloric acid and with warm water and dried. The dye base, 1-(4'-cyclohexyl-cyclohexylamino)-4-(4'-chloro-2'-phenoxy-anilino)-anthraquinone corresponds to the formula:

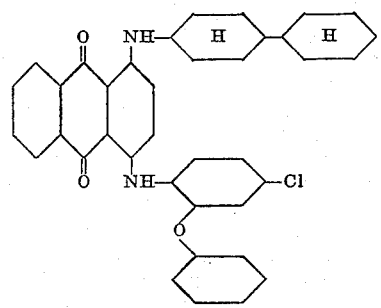

and is obtained in excellent yield and purity.

The dye base is sulphonated in the usual way whereupon the water soluble dyestuff is obtained. It dissolves in concentrated sulphuric acid with a greenish-blue colour. The alkali salts draw from a neutral to weakly acid bath on to wool and silk and produce greenish-blue dyeings which have very good washing and light fastness properties.

If the 46.6 parts of 1-(4'-cyclohexyl-cyclohexylamino)-4-bromo anthraquinone in the above example are replaced by the same number of parts of 1-(2'-cyclohexyl-cyclohexyl-amino)-4-bromo anthraquinone, then a dyestuff is obtained by an analogous reaction which has a similar shade and the same good fastness properties.

*Example 4*

43.8 parts of 1-(decahydro-α-naphthylamino)-4-bromo anthraquinone are stirred at 130–135° with 37 parts of 2-amino diphenyl ether, 5 parts of anhydrous sodium carbonate and 1 part of cuprous chloride for 24 hours in 40 parts of N-amyl alcohol. 150 parts of N-butyl alcohol are then added at 100° and the whole is stirred for another 2 hours at 80–90° whereupon the crystalline precipitate is filtered off warm and washed with warm N-butyl alcohol, with strongly diluted hydrochloric acid and with hot water. The dye base 1-(decahydro-α-naphthyl-amino)-4-(2'-phenoxy-anilino)-anthraquinone is obtained in this way in excellent yield and purity. It corresponds to the formula:

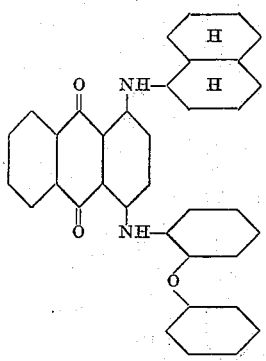

After sulphonating, it produces a dyestuff the alkali salt of which dissolves in water and in concentrated sulphuric acid with a greenish blue colour and which dyes wool and silk from a neutral to weakly acid bath in clear greenish blue shades. The dyeings have very good fastness to wet, washing and light.

If in the above example instead of 43.8 parts of 1-(decahydro-α-naphthylamino) - 4 - bromo anthraquinone, the same number of parts of 1-(decahydro-β-naphthylamino)-4-bromo anthraquinone are used or if 52.6 parts of 2-amino-4'-methyl sulphonyl diphenyl ether are used instead of 37 parts of 2-amino diphenyl ether, then analogous dyestuffs are obtained the wool dyeings of which have the same good properties and very similar shades.

Example 5

38.4 parts of 1-cyclohexylamino-4-bromo anthraquinone in 40 parts of N-amyl alcohol are heated while stirring for 21 hours at 130–135° with 38.5 parts of 2-amino-5-chlorodiphenyl ether, 10.5 parts of anhydrous potassium acetate and 1 part of copper acetate. 80 parts of N-butyl alcohol are then added at 100° and the whole is stirred for another 7 hours at 50–60°. The reaction product is then filtered off and washed first with hot methanol then with strongly diluted hydrochloric acid and finally with hot water.

The crude product is recrystallised from N-butyl alcohol and produces in good yield and excellent purity the dye base 1-cyclohexylamino-4-(4'-chloro-2'-phenoxy-anilino)-anthraquinone of the formula:

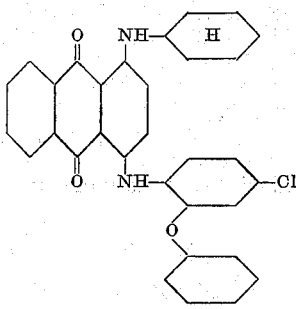

It is sulphonated with 10 times the amount of concentrated sulphuric acid for 21 hours at 20–25° and, after working up in the usual way, it produces a dyestuff which, in the form of the sodium salt dissolves in water and in concentrated sulphuric acid in pure greenish blue shade. It dyes wool and silk from a neutral bath greenish blue and the dyeings have very good fastness to washing and milling and excellent fastness to light.

If in the above example, instead of 38.4 parts of 1-cyclohexylamino-4-bromo anthraquinone, 45.3 parts of 1-cyclohexylamino-6.7-dichloro-4-bromo anthraquinone are used for the condensation and otherwise the same procedure is followed, then a dyestuff with similar properties is obtained.

If in the above example instead of the 38.5 parts of 2-amino-5-chlorodiphenyl ether, 43.7 parts of 2-amino-5-chloro-2'-methoxy-diphenyl ether or 40.9 parts of 2-amino-5-chloro-2'-methyl-diphenyl ether or 2-amino-5-chloro-3'-methyl-diphenyl ether or 2-amino-5-chloro-4'-methyl-diphenyl ether or 45.8 parts of 2-amino-5-chloro-4'-isopropyl diphenyl ether are used, then dyestuffs are obtained the wool dyeings of which have very similar shades and fastness properties.

Example 6

38.4 parts of 1-cyclohexylamino-4-bromo anthraquinone are stirred for 24 hours at 130–135° with 38.5 parts of 2-amino-4-chloro-diphenyl ether with the addition of 10.4 parts of anhydrous potassium acetate and 1 part of copper acetate in 40 parts of N-amyl alcohol. After the addition of 80 parts of N-butyl alcohol, the temperature is allowed to cool to room temperature while stirring all the time. The crystalline crude product is filtered off and washed successively with a lot of hot methanol, hot strongly diluted hydrochloric acid and hot water. The dried crude product is recrystallised from N-butyl alcohol. The dye base which is obtained in a pure state, 1-cyclohexylamino-4-(5'-chloro - 2' - phenoxy-anilino)-anthraquinone, has the formula:

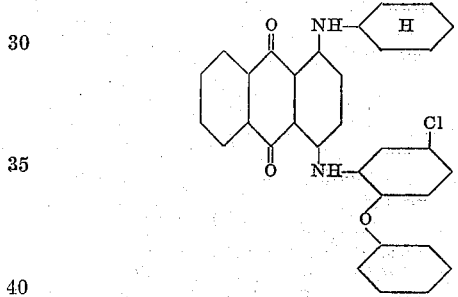

It is sulphonated with 10 times the amount of concentrated sulphuric acid at 20–25° and converted in the usual way into the alkali salts. The dyestuff dissolves in water with a greenish blue and in concentrated sulphuric acid with a greenish dull grey-blue colour. It dyes wool and silk in a neutral to weakly acid bath in greenish blue shades. The wool dyeings have very good wet, washing and light fastness properties.

If in the above example instead of 38.4 parts of 1-cyclohexylamino-4-bromo anthraquinone, 44 parts of 1-(3'.5'-diethyl-cyclohexylamino)-4-bromo anthraquinone, 42.6 parts of 1-(2'.4'.6'-trimethyl-cyclohexylamino)-4-bromo anthraquinone or 39.8 parts of 1-(4'-methyl-cyclohexylamino)-4-bromo anthraquinone are used, then analogous dyestuffs are obtained in a similar manner which dye wool and silk in very similar shades which have similar fastness properties.

If in the above example instead of the 2-amino-4-chloro-diphenyl ether, 35 parts of 2-amino-3-methyl diphenyl ether or 37.5 parts of 2-amino-3.5-dimethyl diphenyl ether or 43.6 parts of 2-amino-3-methyl-1-(1'- or 2'-naphthyloxy)-benzene or 46.1 parts of 2-amino-3.5-dimethyl-1-(1'- or 2'-naphthyloxy)-benzene are used and otherwise the same procedure is followed, then very pure blue dyestuffs are also obtained which have similar properties.

Example 7

16 parts of quinizarin, 8.1 parts of leuco quinizarin and 10.4 parts of cyclohexylamine are dissolved in 100 parts of N-butyl alcohol and, after the addition of 5 parts of boric acid, the whole is stirred for 18 hours at 110–115°. Then 2 parts of zinc dust and 10 parts of glacial acetic acid are added to the solution still at a temperature of 110–115° and, after a further half hour, 51 parts of 2-amino-4'-n-amyl diphenyl ether are added all at once. The reaction mixture is again stirred for 20 hours at 110–115°. The reaction product is precipitated from the solution by introducing air for a long time or by oxidation with 15 parts of sodium perborate at 70–80°, filtered off and washed successively with a little warm N-butyl alcohol, with strongly diluted hydrochloric acid and with a lot of hot water. The dye base obtained in good purity and yield of the formula:

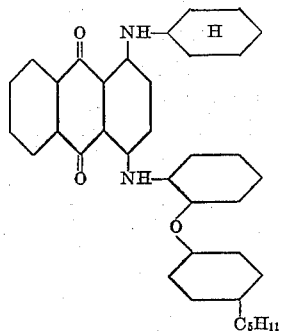

is further purified by recrystallisation from N-butyl alcohol and then sulphonated in the usual way. In the form of the alkali salt the dyestuff dissolves in water with a blue and in concentrated sulphuric acid with a dull blue colour. It dyes wool and silk from a neutral to weakly acid bath in blue shades. The wool dyeings are distinguished by good wet, washing and excellent light fastness properties.

The same dye base is obtained if 38.4 parts of 1-cyclohexylamino-4-bromo anthraquinone are used as starting product and this, with 44.6 parts of 2-amino-4'-n-amyl diphenyl ether with the addition of 8.5 parts of anhydrous sodium acetate and 0.5 part of copper powder is condensed in the melt for 21 hours at 135–140°.

Also the same dyestuff can be built up by heating 25.9 parts of 1-hydroxy-4-chloro anthraquinone with 44.6 parts of 2-amino-4'-n-amyl diphenyl ether with the addition of 10.4 parts of potassium acetate and 1 part of copper acetate for 18 hours at 135–140°, methylating the reaction product with dimethyl sulphate and condensing with 19.8 parts of cyclohexylamine with the addition of 10.4 parts of potassium acetate and 1 part of copper acetate at 135–140° in the melt for 20 hours.

Example 8

A melt of 38.4 parts of 1-cyclohexylamino-4-bromo anthraquinone, 37.3 parts of 4-amino-3.5-dimethyl diphenyl ether, 7 parts of potash and 1 part of cuprous chloride is stirred for 40 hours at 125–130°. 100 parts of N-butyl alcohol are added to the reaction mass and the whole is stirred for another 2 hours at 80–90°. The precipitated condensation product, 1-cyclohexylamino-4-(4'-phenoxy-2'.6'-dimethyl anilino)-anthraquinone is filtered off, washed with a little warm N-butyl alcohol, strongly diluted mineral acid and a lot of hot water and then dried.

After then sulphonating, a dyestuff is obtained, the alkali salts of which dissolve in water and in concentrated sulphuric acid with a pure blue colour, and dye wool from a neutral to weakly acid bath in pure blue shades. The wool dyeings have very good fastness to wet and light.

If in the above example the 37.3 parts of 4-amino-3.5-dimethyl diphenyl ether are replaced by 39.7 parts of 4-amino-3.5-dimethyl-4'-methyl diphenyl ether or 42.5 parts of 4-amino-3.5-dimethyl-4'-methyl diphenyl sulphide or 37.3 parts of 3-amino-2.4-dimethyl diphenyl ether or 39.7 parts of 3-amino-2.4.4'-trimethyl diphenyl ether or 43.4 parts of 3-amino-2.4-dimethyl-4'-chlorodiphenyl ether, then very similar dyestuffs with equally good fastness properties are obtained.

Example 9

38.4 parts of 1-cyclohexylamino-4-bromo anthraquinone, 43.3 parts of 4-amino-3.5-dimethyl-4'-chlorodiphenyl ether, 10.4 parts of potassium acetate and 1 part of copper acetate in 35 parts of N-amyl alcohol are stirred for 24 hours at 130–135°. 80 parts of N-butyl alcohol are added, the whole is stirred for another hour at 80–90° and then allowed to cool while stirring. The product, filtered off at room temperature, 1-cyclohexylamino-4-(4'-p-chlorophenoxy - 2'.6' - dimethyl-anilino)-anthraquinone of the formula:

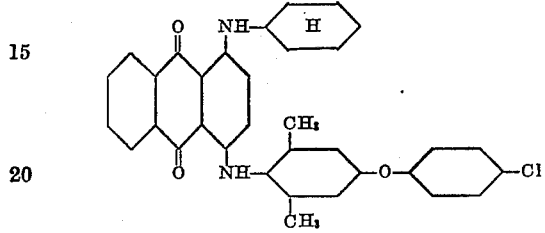

is washed successively with warm N-butyl alcohol, warm strongly diluted mineral acid and hot water. It is obtained in a pure form by recrystallisation from N-butyl alcohol.

The dried dye base is sulphonated in the usual way and converted into the alkali salts. The dyestuff dissolves in water and in concentrated sulphuric acid with a pure blue colour and dyes wool and silk in a neutral to weakly acid dyebath in pure blue shades which have good fastness properties.

If in the above example, instead of the 43.3 parts of 4-amino-3.5-dimethyl-4'-chlorodiphenyl ether, 51.1 parts of 4-amino-3.5-dimethyl-4'-bromodiphenyl ether or 47.5 parts of 4-amino-3.5-dimethyl-4'-chlorodiphenyl sulphide or 48.3 parts of 4-amino-3.5-dimethyl-4'-bromodiphenyl sulphide or 70.5 parts of 4-amino-3.5-dimethyl-1-(4'-benzyl-phenoxy)-benzene or 71 parts of 4-amino-3.5-dimethyl-1-(4'-phenoxy-phenoxy)-benzene or 73 parts of 4-amino-3.5-dimethyl-1-(4'-benzoyl-phenoxy)-benzene or 68.4 parts of 4-amino-3.5-dimethyl-1-(4'-phenyl-phenoxy)-benzene are used, then analogous dyestuffs are obtained which dye wool and silk in very similar blue shades which have the same good fastness properties.

Example 10

38.4 parts of 1-cyclohexylamino-4-bromo anthraquinone are pasted in 40 parts of glacial acetic acid and after the addition of 37.5 parts of 2-amino-4'-methyl diphenyl sulphide, 8.5 parts of sodium acetate and 0.5 part of copper powder, the whole is heated for 24 hours at 115–120°. By adding 80 parts of glacial acetic acid and further stirring at 70–80° for one hour, the condensation product, 1 - cyclohexylamino - 4 - (2'-p-tolyl-mercapto-anilino)-anthraquinone of the formula:

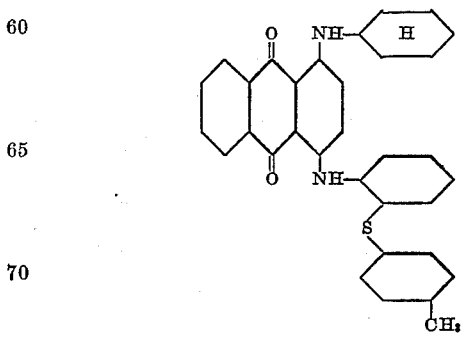

precipitates in crystalline form. It is filtered off and washed successively with cold glacial acetic acid and hot water. The dyestuff obtained in the usual way by sulphonating the dye base dissolves in water with a pure blue and in concentrated sulphuric acid with a dirty grey-brown colour. It produces greenish blue dyeings on wool and silk which have good fastness to washing and milling and good light fastness.

If in the above example the 37.6 parts of 2-amino-4'-methyl diphenyl sulphide are replaced by 42.5 parts of 2-amino-4'-n-propyldiphenyl sulphide or by 45 parts of 2-amino-4'-n-butyl diphenyl sulphide or by 60.7 parts of 2.4-bis-(p'-tolyl-mercapto)-aniline or by 66.2 parts of 2.4-bis-(p'-chlorophenyl-mercapto)-aniline or by 40 parts of 2-amino-3.4'-dimethyl diphenyl sulphide or by 42.5 parts of 2-amino-3.5.4'-trimethyl diphenyl sulphide, then analogous dyestuffs are obtained which have very similar properties with regard to shade and fastness.

*Example 11*

38.4 parts of 1-cyclohexylamino-4-bromo anthraquinone, 60.6 parts of 2.4-bis-(p'-chlorophenoxy)-aniline, 10.4 parts of potassium acetate and 1 part of copper acetate are stirred in 40 parts of N-amyl alcohol for 22 hours at 130–135°. After this time, 100 parts of N-butyl alcohol are added, the whole is stirred for another 2 hours at 80–90° and then filtered. The filter cakes are washed successively in warm N-butyl alcohol, strongly diluted mineral acid and hot water and finally recrystallised from N-butyl alcohol. The dye base so obtained in good yield and purity, 1-cyclohexylamino-4-(2'.4'-bis - p'' - chlorophenoxy-anilino)-anthraquinone, corresponds to the formula:

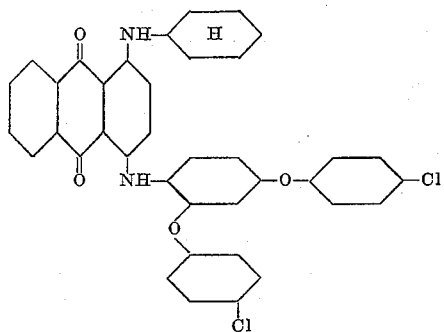

and can be converted into a dyestuff by sulphonation which dissolves in water with a greenish blue and in concentrated sulphuric acid with a dull blue colour. It produces greenish blue dyeings on wool and silk from a neutral to weakly acid bath which have very good washing and light fastness properties.

If in this example instead of the 60.6 parts of 2.4-bis-(p'-chlorophenoxy), aniline, the same number of parts of 2.4-bis-(o'-chlorophenoxy)-aniline or 57 parts of 2-(p'-chlorophenoxy)-4-(o'-methyl phenoxy)-aniline or 57 parts of 2-(p'-chlorophenoxy)-4-(p'-methyl phenoxy)-aniline or 59.8 parts of 2-(p'-chlorophenoxy)-4-(p'-tolyl mercapto)-aniline or 59 parts of 4-amino-1.3-di-p-anisyl phenyl ether are used, then dyestuffs with similar shades and equally good fastness properties are obtained.

*Example 12*

A mixture of 18.3 parts of 6-chloroquinizarin and 9.2 parts of 6-chloro-leuco-quinizarin is dissolved in 150 parts of N-butyl alcohol and, with 9.9 parts of cyclohexylamine after the addition of 5 parts of boric acid, boiled while stirring for 24 hours. Then 2 parts of zinc dust and 15 parts of glacial acetic acid are added and it is again heated to 110–115°; after half an hour 38.4 parts of 2-amino-4-chlorodiphenyl ether are added and the whole is stirred for 20 hours at 110–115°. By adding 15 parts of sodium perborate and stirring for a short time at 70–80°, the condensation product, 1-cyclohexylamino-4-(2'-phenoxy-5'-chlor-anilino)-6 - chloroanthraquinone, is oxidised to form the dye base of the formula:

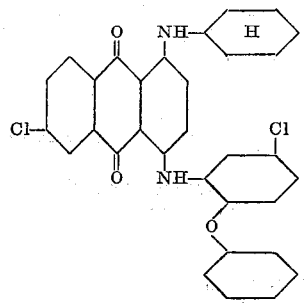

which is filtered off at 40°, washed with a little N-butyl alcohol strongly diluted mineral acid and hot water. The product in a high degree of purity is obtained by crystallisation from N-butyl alcohol.

The dyestuff is obtained therefrom by sulphonation. It dissolves in water and in concentrated sulphuric acid with a strong greenish blue colour and produces greeny-blue dyeings on wool and silk which have very good wet, washing and milling fastness properties as well as very good light fastness.

If the 18.3 parts of 6-chloro-quinizarin and 9.2 parts of 6-chloro-leuco-quinizarin are replaced by 21.3 parts of 6-bromo-quinizarin and 10.7 parts of 6-bromo-leuco-quinizarin or by 17.2 parts of 6-fluoroquinizarin and 8.7 parts of 6-fluoro-leuco-quinizarin or by 20.6 parts of 6.7-dichloroquinizarin and 10.4 parts of 6.7-dichloro-leuco-quinizarin, then dyestuffs which have almost the same shade, drawing power and fastness properties as that first mentioned are obtained.

*Example 13*

100 parts of wool flannel are entered at 40–45° into a dyebath containing 1 part of the dyestuff according to Example 5, 3 parts of ammonium sulphate or 5 parts of ammonium acetate and 10 parts of Glauber's salt in 3000 parts of water. The bath is gradually brought to the boil within 45 minutes, kept at the light boil for a half hour and then the dyed goods are rinsed. A very level, greenish blue wool dyeing is obtained which has very good washing, milling and light fastness.

What we claim is:
1. An acid dyestuff of the anthraquinone series having the general formula:

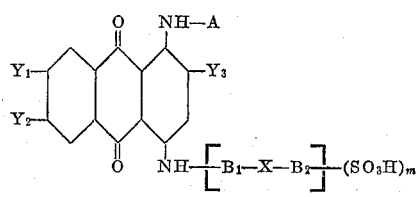

wherein A represents a member selected from the group consisting of cyclohexyl, lower alkyl-substituted cyclohexyl, cyclohexyl-substituted cyclohexyl and decahydronaphthyl radicals, $B_1$ represents a member selected from the group consisting of mononuclear and unfused binuclear carbocyclic radicals, the carbocyclic rings being six-membered, $B_2$ represents a member selected from the group consisting of mononuclear carbocyclic radicals containing six members in the ring, and naphthyl, X represents a member selected from the group consisting of O and S, $Y_1$, $Y_2$ and $Y_3$ each represents a member selected from the group consisting of hydrogen, chlorine, bromine and fluorine and, $m$ is a numeral not greater than 2.

2. An acid dyestuff of the anthraquinone series having the general formula:

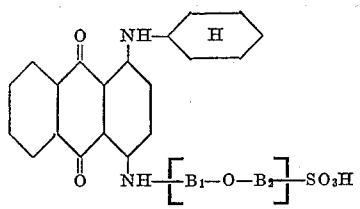

wherein $B_1$ and $B_2$ represent a phenyl radical.

3. An acid dyestuff of the anthraquinone series having the formula:

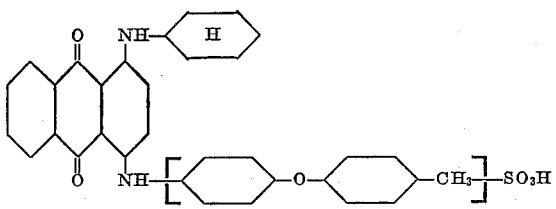

4. An acid dyestuff of the anthraquinone series having the formula:

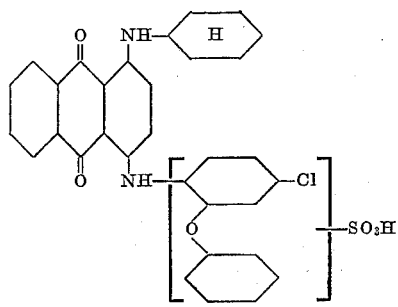

5. An acid dyestuff of the anthaquinone series having the formula:

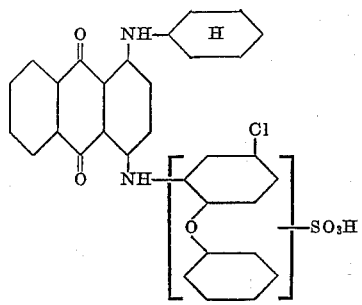

6. An acid dyestuff of the anthraquinone series having the formula:

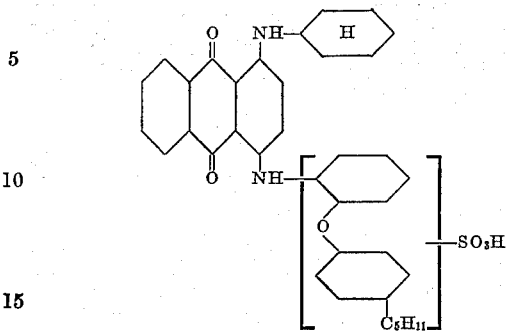

7. An acid dyestuff of the anthraquinone series having the formula:

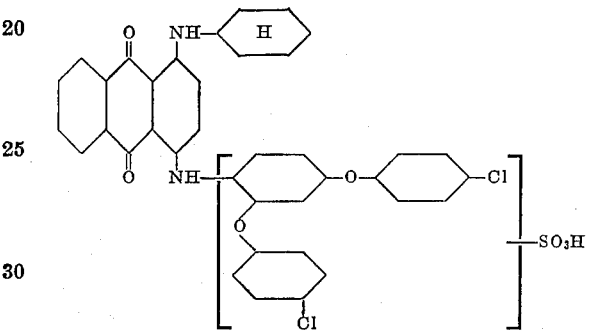

References Cited in the file of this patent
UNITED STATES PATENTS

| | | |
|---|---|---|
| 1,928,725 | Honold et al. | Oct. 3, 1933 |
| 2,158,473 | Mettler | May 16, 1939 |